United States Patent [19]
Matthews

[11] 3,934,606
[45] Jan. 27, 1976

[54] CAM LOCKED BALL VALVE

[75] Inventor: Raymond E. Matthews, Campbel, Calif.

[73] Assignee: Grove Valve and Regulator Company, Oakland, Calif.

[22] Filed: June 20, 1974

[21] Appl. No.: 481,040

[52] U.S. Cl. ............ 137/454.6; 251/159; 251/163
[51] Int. Cl.² ........................................ F16K 25/00
[58] Field of Search............. 137/315, 454.5, 454.6; 251/159, 162, 163, 160, 170, 215, 216, 307

[56] References Cited
UNITED STATES PATENTS

| | | | |
|---|---|---|---|
| 2,661,926 | 12/1953 | Resek | 251/159 |
| 2,883,146 | 4/1959 | Knox | 251/163 X |
| 3,245,653 | 4/1966 | Lavigueur | 251/159 |
| 3,269,691 | 8/1966 | Meima | 251/159 |
| 3,323,542 | 6/1967 | Magos | 137/315 |
| 3,776,505 | 12/1973 | Nakanishi | 251/163 |

Primary Examiner—Harold W. Weakley
Attorney, Agent, or Firm—Melvin R. Stidham, Esq.

[57] ABSTRACT

A trunnion mounted ball valve with cam plates mounted on the stem axis. Cam followers on the seat rings engage in cam slots in the plates to move the seats positively into firm engagement with the ball at the open and closed positions thereof and retract them free of the ball as it is moved between those positions. The seats slide axially in slide rings which are threaded into the body around the flow passage. The valve ball, seat rings, and slide rings may be removed as a unit through the valve top opening.

6 Claims, 4 Drawing Figures

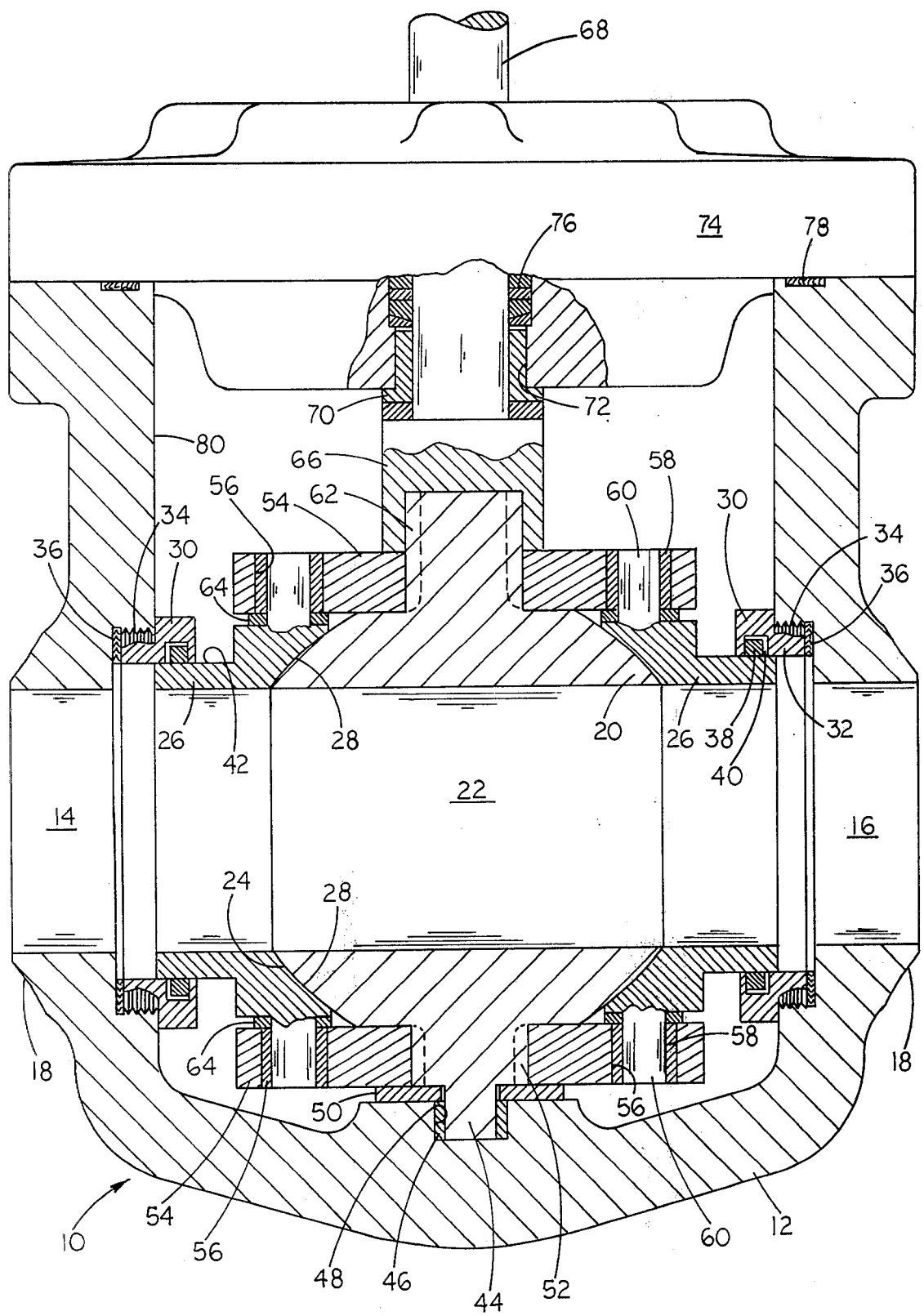
FIG.-1-

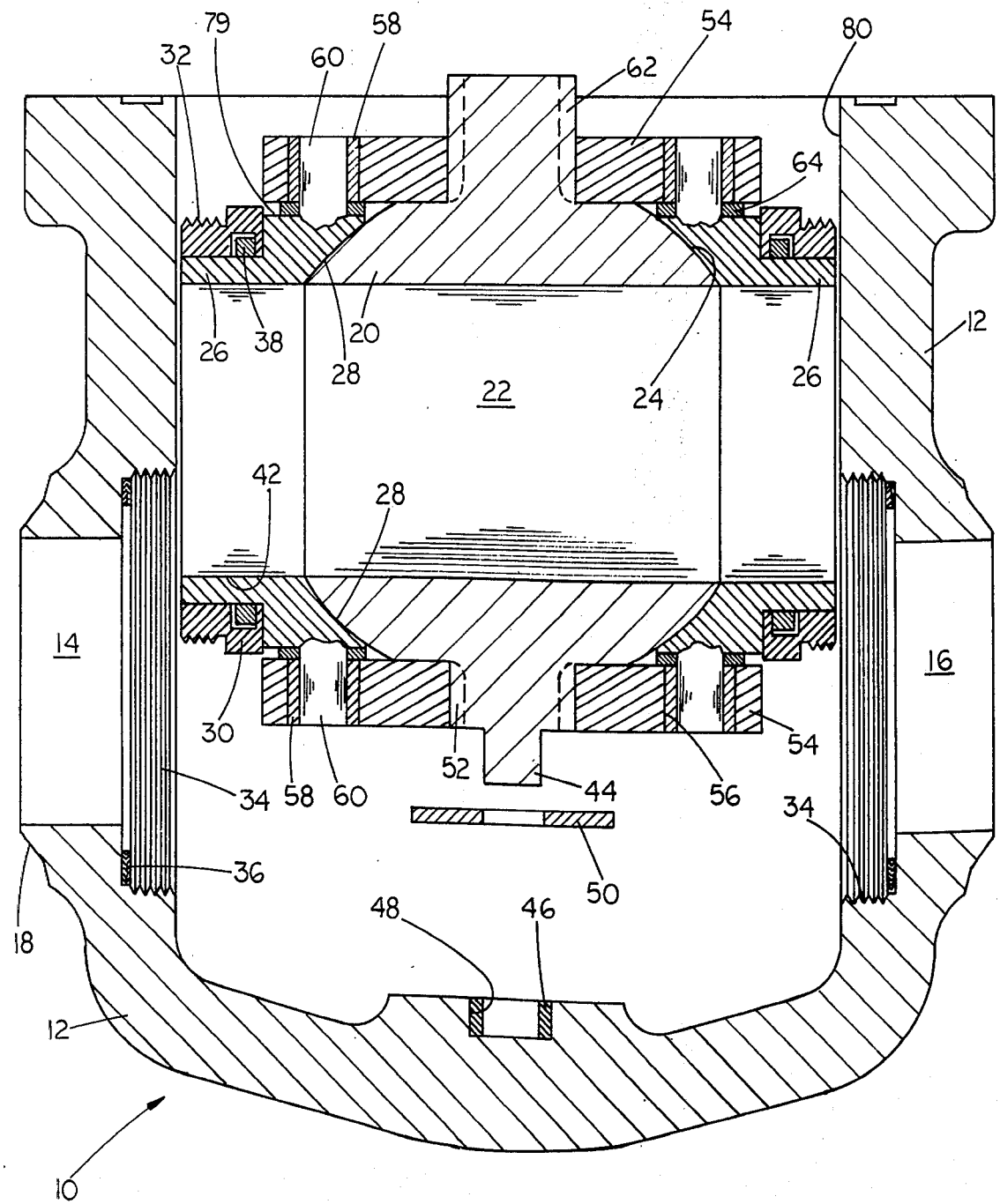
FIG-2-

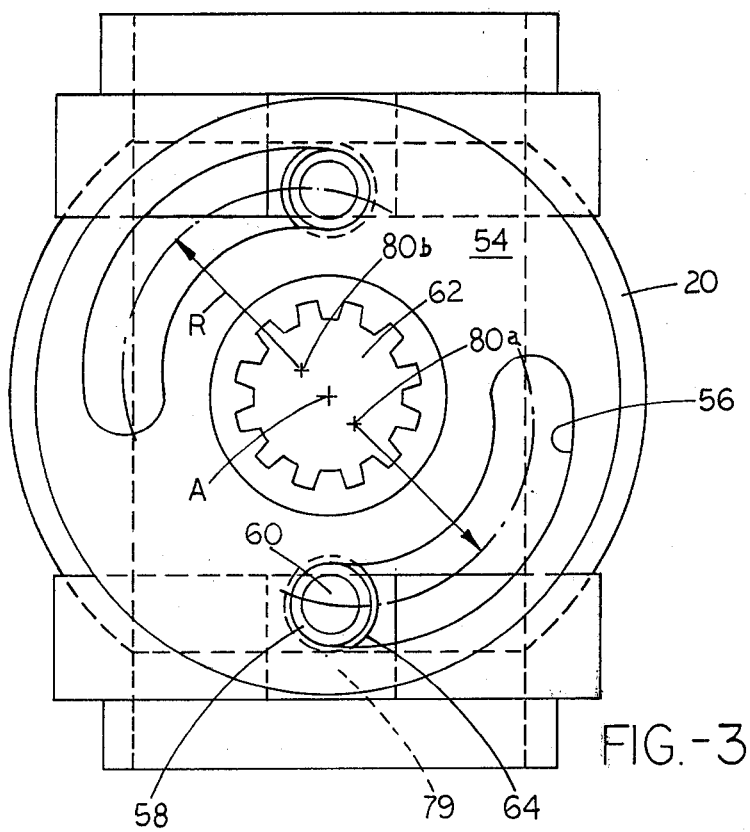
FIG.-3-
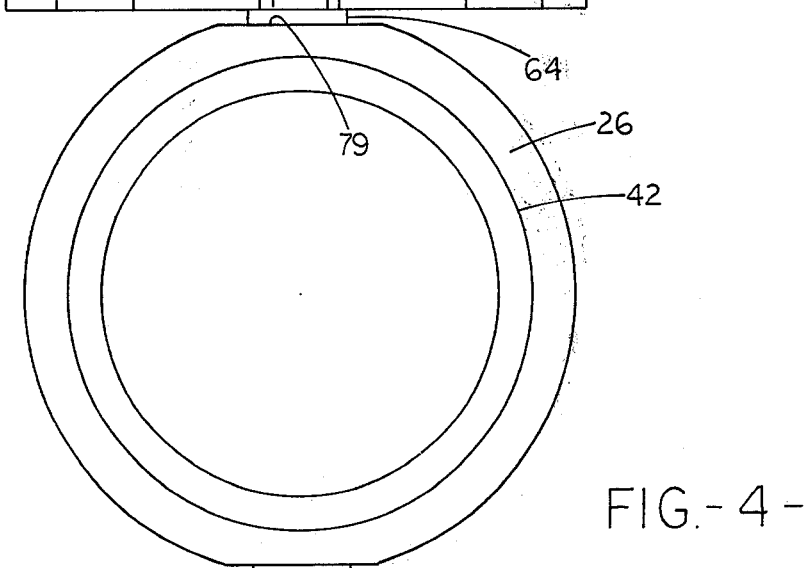
FIG.-4-

CAM LOCKED BALL VALVE

BACKGROUND OF THE INVENTION

In some ball valve services, such as in high temperature fluid lines, it is desirable to provide valves with all metalic components, including the seats and seals. When such are employed, it is further desirable to have a sealing force biasing the seat ring against the ball to insure fluid tight sealing. This is conventionally accomplished with use of system pressures, eccentric loading, spring means or a combination thereof. However, if such a force is maintained at all times, it may require excessive torque to operate the valve, and it may result in scoring, wearing and galling of the valve components. Moreover, where corrosive fluids are being handled, spring failures are common and frequent spring replacement and servicing of the valves are necessitated.

OBJECTS OF THE INVENTION

It is an object of this invention to provide a high temperature ball valve which has fluid tight, metal to metal seals, but which may be operated with relatively low torque requirements.

It is a further object of this invention to provide a trunnion mounted ball valve wherein the seat seals are in firm engagement with the ball when the valve is closed, but not during valve operation.

It is a further object of this invention to provide a trunnion mounted ball valve which has positive metal to metal seals on both the upstream and downstream sides of the ball.

It is a further object of this invention to provide a trunnion mounted ball valve which has positive metal to metal seals which are not dependent upon system pressure or spring devices.

It is a further object of this invention to provide a trunnion mounted ball valve wherein the seat rings are moved into engagement with the ball only at the full open and closed positions thereof.

It is a further object of this invention to provide a ball valve which provides top entry accessibility to service the valve in the line.

It is a further object of this invention to provide a ball valve with top entry accessibility enabling the removal and replacement of all valve components as a unit.

Other objects and advantages of this invention will become apparent from the description to follow when read in conjunction with the accompanying drawings.

BRIEF SUMMARY OF THE INVENTION

In carrying out this invention, at least one cam plate is splined to a stem of a trunnion mounted ball valve. Cam follower rollers on the seat rings engage in arcuate slots in the plates and the cam assembly functions to lock the seats positively against the ball at both open and closed positions, but to retract the seat rings from the ball as it is moved between such positions. In operation, the ball is turned through approximately 90° between open and closed positions and the seat rings contact the ball during just a few degrees of movement at the beginning and end of the quarter turn. This provides a wiping action, cleaning the ball at the beginning and end of the turn, and a positive seal in both open and closed positions, but leaves the seat rings clear of the ball to facilitate turning thereof during most of the valve operation. The seat rings slide axially in slide rings which are threaded into the body around the flow passageway. With the bonnet removed, the slide rings may be threaded free of the body and the entire unit, i.e. valve ball, seat rings, and slide rings, may be removed from the body for quick servicing and/or replacement thereof without removing the valve from the line.

BRIEF DESCRIPTION OF THE DRAWINGS

In the drawings:

FIG. 1 is a vertical section view of a trunnion mounted ball valve embodying features of this invention;

FIG. 2 is a vertical section view of the ball valve with ball and seat rings in process of installation;

FIG. 3 is a top view of the valve ball and seat ring assembly comprising features of this invention; and FIG. 4 is an elevation view of the cam discs with seat ring carried thereon.

DESCRIPTION OF A PREFERRED EMBODIMENT

Referring now to FIG. 1 with greater particularity, the trunnion mounted ball valve 10 of this invention includes a valve body 12 which may be cast or otherwise formed with axially aligned flow passages 14 and 16 with means such as the weld-ends 18 shown, for installing the valve into a pipeline (not shown). Rotatably mounted in the body is a valve ball 20 having a flow port 22 therethrough which, when turned to the open position shown in FIG. 1, is aligned with the body flow passageways 14 and 16 to enable flow of fluid therethrough.

For sealing against the surface 24 of the ball 20, is a pair of seat rings 26, preferably of metal, the forward faces 28 of which are preferably machined to a spherical surface to conform to that of the ball. The seat rings 26 are slidable axially in machined slide rings 30 the tail portions 32 of which are threadedly received in complementary threads 34 formed in the valve body 12 around the flow passageways 14 and 16. Suitable gaskets 36 are provided to seal around the slide rings 30 and a piston ring seal 38 is carried in a recess 40 in the slide ring to seal against the trailing cylindrical surfaces 42 of the seat rings 26. Because the slide rings are removable and replaceable, it is apparent that field repairs are greatly facilitated and seat rings 26 and slide rings 30 may be replaced without further machining.

A lower trunnion 44 on the ball is rotatably received in a bearing 46 carried within a bearing recess 48 and axial loads are taken by a thrust bearing 50. Adjacent to the trunnion portion is a spline section 52 on which is non-rotatably carried a lower cam disc 54 having arcuate slots 56 therein (FIG. 3) to receive cam follower rollers 58 which are rotatably carried on pins 60 extending outward from the seat rings 26. A second set of pins 60 are carried at the upper portions of the seat rings to carry cam follower rollers 58 in arcuate slots 56 in an upper cam disc 54 which is non-rotatably carried on a spline member 62 which extends coaxially from the upper portion of the ball 20. Thrust bearings 64 are provided on both upper and lower cam rollers.

Also received on the upper spline, is a coupling portion 66 on the valve stem 68. The valve stem is rotatably received in a combined thrust and rotary bearing 70 which is received in a stem bore 72 in the valve bonnet, suitable packing 76 being provided to seal around the stem and at 78, around the valve body 12. Hence, it is apparent that rotation of the stem will be transmitted through the spline section 66, 62 directly to the ball 20, and of course, the cam discs 54 turn with the ball.

Referring now to FIG. 3, the cam slots are formed so that the cam follower rollers 58 are urged radially inwardly at the extremities of the approximately 90° rotation of the ball. This may be accomplished, as shown, by centering the slots 56 about centers of rotation 80a and 80b displaced from the axis A of the ball a short distance in the direction of the slots and forming the slots 56 on a radius R which is tangent to a circle drawn about the ball axis at the extremities of the cam slot. Hence, at all points along the arcuate slot, its center line is displaced radially outward from a circle drawn about the ball axis A, except at the extremities, where the circles are tangent. With the construction so described, it is apparent that the cam rollers 58 will be pulled radially inward to lock the seat rings 26 into firm engagement with the ball at both the full open and the full closed positions of the valve ball 20 and that the seat rings 26 will be retracted from the ball surface in intermediate positions to facilitate rotary operation of the valve ball. In practice, the ball turns through approximately 93° between open and closed position with initial contact with the ball taking place at approximately 87°. This provides a wiping action at the start and finish of the turn to clean sealing surfaces and, in addition, it insures firm sealing surfaces for extended valve life performance.

Referring now to FIG. 4, the bearing discs 64 carried on the pins 60 are seen to ride on flats 79 formed in the seat ring 26 so that the seat rings themselves will not rotate as the cam follower rollers 58 move along the arcuate slots 56 in the cam discs 54.

As shown most clearly in FIG. 2, the valve body cavity 80 is of a generally cylindrical configuration and is of sufficient diameter to receive the ball 20 with seat rings 26 carried thereon. Hence, in installation, the rotary and thrust bearings 48 and 50 are placed; one cam disc 54 is secured on the spline section; the seat rings 26 are positioned and held in place by the other cam disc 54 secured on the opposite spline shaft extension 62 and then, after the slide rings are slipped over the cylindrical tail sections 42 of the seat rings 26 the entire assembly is lowered into the valve cavity. Finally, by use of a span wrench or the like, the slide rings 30 are threaded into the complementary threads 34 in the valve body. Assembly is completed by placing the valve stem 68 and bolting the bonnet 74 in place.

While this invention has been described in conjunction with a preferred embodiment thereof, it is obvious that modifications and changes therein may be made by those skilled in the art without departing from the spirit and scope of this invention.

I claim:

1. A trunnion mounted plug valve comprising:
a valve body having a flow passageway therethrough;
a valve seat ring in said body around said flow passageway and movable axially thereof;
a valve plug having a flow port therethrough rotatable in said body between an open position with said flow port aligned with said seat ring and a closed position blocking fluid flow through said seat ring;
a cam plate fixed on said plug around a trunnion thereof to rotate therewith;
an arcuate cam slot in said plate;
a cam follower on said seat ring extending into said slot to be engaged by opposite edges thereof;
said cam slot extending through approximately 90° around the trunnion axis and curving closer to said axis at one end thereof so that said cam slot and follower are operative to move said seat ring axially away from said plug when said plug is rotated from said closed position, to move said seat ring positively into firm engagement therewith as said plug is rotated into its closed position, and to lock it in firm engagement therewith while in said closed position.

2. The trunnion mounted plug valve defined by claim 1 wherein:
said cam slot curves closer to said axis at the other end thereof so that said cam slot and follower are operative to move said seat ring axially positively away from and into firm engagement with said plug as said plug is rotated, respectively, from and into its open position.

3. The trunnion mounted plug valve defined by claim 1 including:
a second cam plate fixed around the other trunnion of said plug to rotate therewith;
a cam slot in said second cam plate; and
a cam follower on the diametrically opposite side of said seat ring extending into said slot to be engaged by opposite edges thereof.

4. The trunnion mounted plug valve defined by claim 3 wherein:
the termini of said cam slots are on a circle drawn about said operating axis; and
said cam slots are on an arc of a radius smaller than said circle but centered closer to said slot than said operating arms.

5. The trunnion mounted plug valve defined by claim 1 including:
a top entry opening in said valve body;
a bonnet closure on said valve body covering said opening;
a body slide ring coaxial with and slidably receiving therein an outer cylindrical surface of said seat ring;
complementary threads on said body and said slide ring removably securing said slide ring in place around said flow passageways;
a seal ring sealing between said slide ring and said seat ring;
said valve plug, said slide ring and said seat ring being removable and replaceable as a unit through said top entry opening.

6. A trunnion mounted ball valve comprising:
a valve body having a flow passageway therethrough;
a top entry opening in said valve body in communication with said flow passageway;
a bonnet closure on said valve body covering said opening;
a valve seat ring in said body around said flow passageway and movably axially thereof;
a valve ball having a flow port therethrough rotatable in said body between an open position with said flow port aligned with said seat ring and a closed position blocking fluid flow through said seat ring;
a body slide ring coaxial with and slidably receiving therein an outer cylindrical surface on said seat ring;

complementary threads on said body and said slide ring removably securing said slide ring in place around said flow passageway;

a seal ring sealing between said slide ring and said seat ring;

said top entry opening being so configurated and of sufficient size that said valve ball, said slide ring and said seat ring are removable and replaceable as a unit through said top entry opening.

* * * * *

UNITED STATES PATENT OFFICE
CERTIFICATE OF CORRECTION

Patent No. 3,934,606　　　　　　　　Dated January 27, 1976

Inventor(s) Raymond E. Matthews

It is certified that error appears in the above-identified patent and that said Letters Patent are hereby corrected as shown below:

On cover sheet,

Assignee: should read --Valve Systems International, Inc.

Signed and Sealed this sixth Day of April 1976

[SEAL]

Attest:

RUTH C. MASON
*Attesting Officer*

C. MARSHALL DANN
*Commissioner of Patents and Trademarks*